United States Patent Office 3,387,689
Patented June 11, 1968

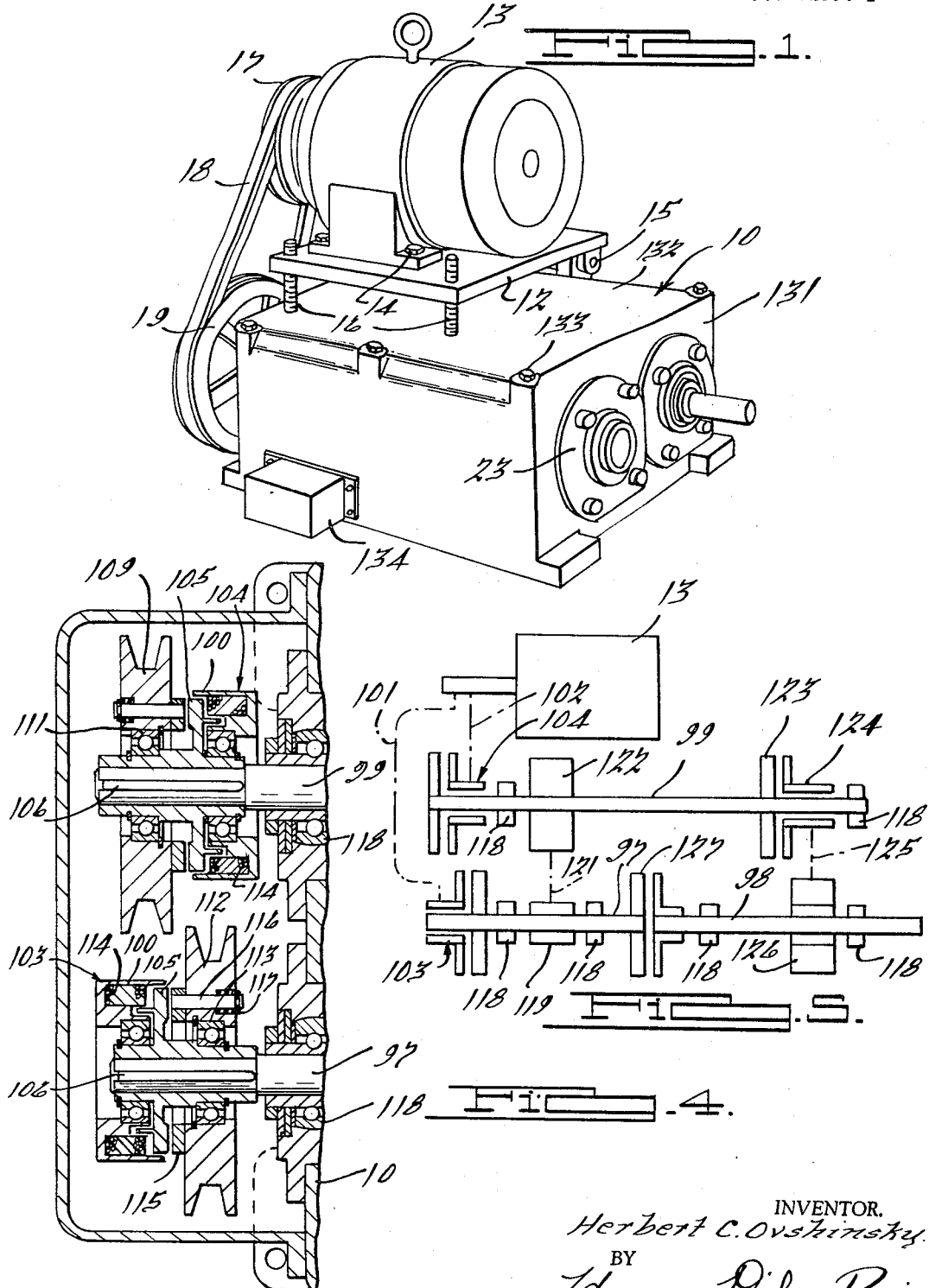

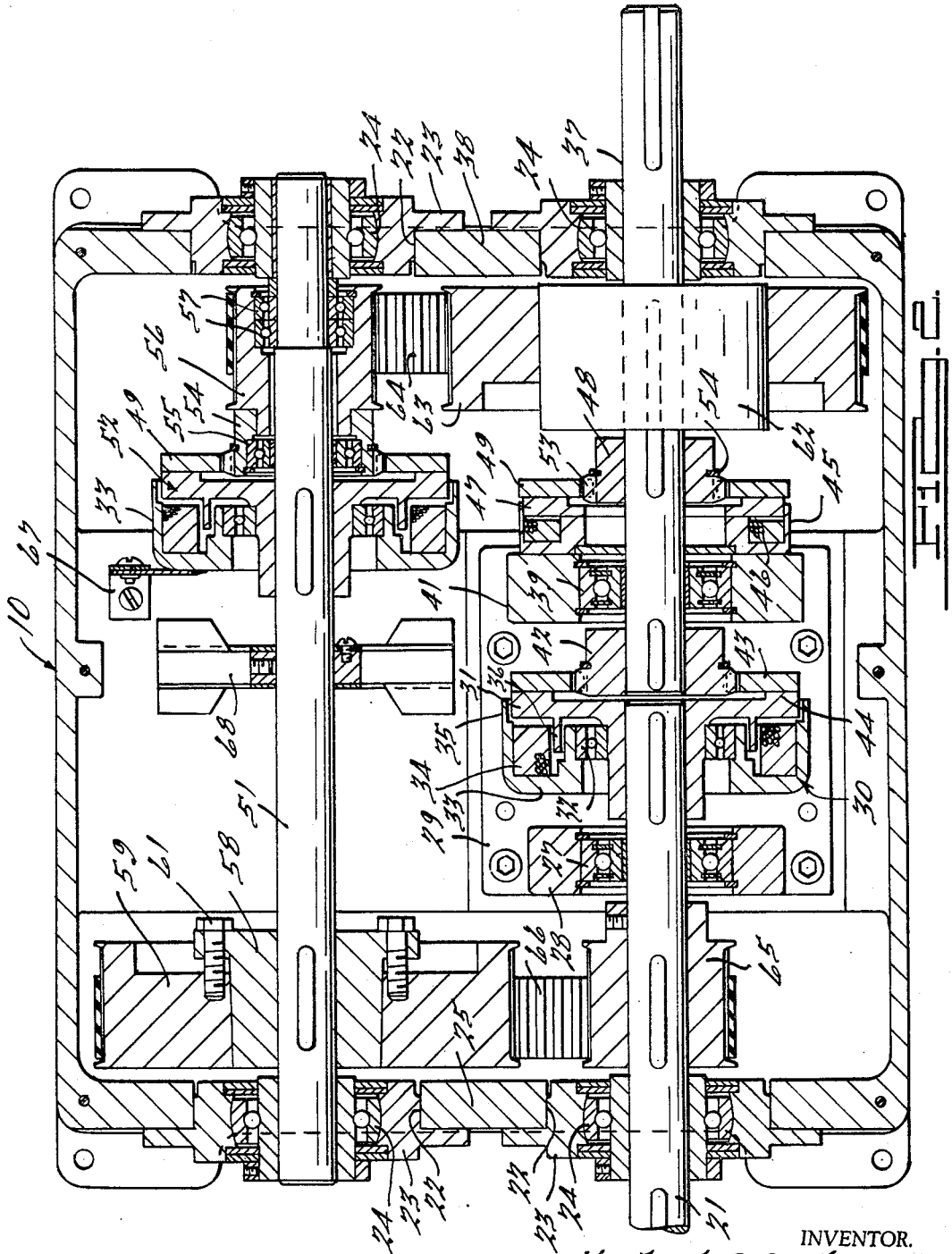

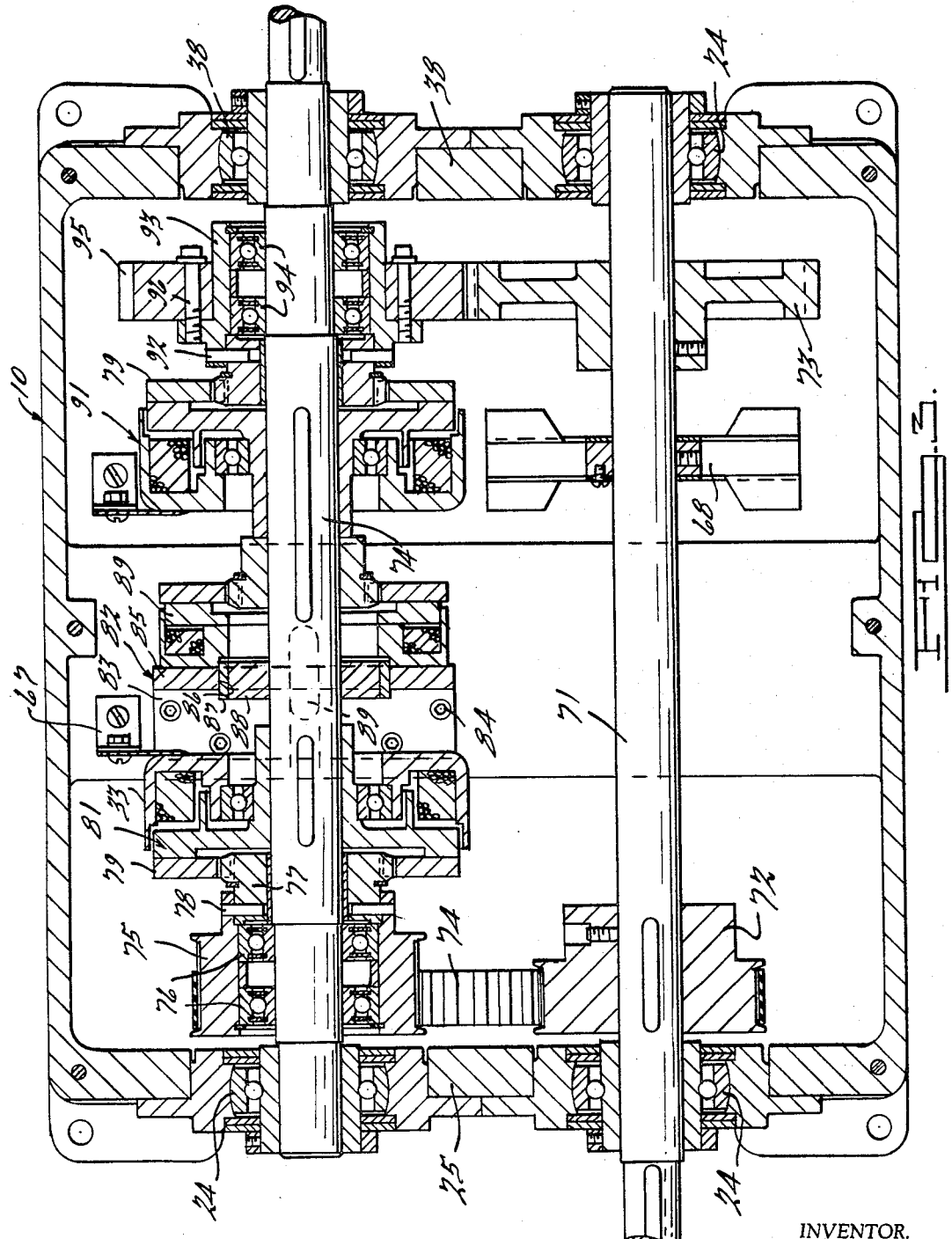

3,387,689
ELECTROMAGNETIC CLUTCH AND
BRAKE TRANSMISSIONS
Herbert C. Ovshinsky, 15200 Leslie,
Oak Park, Mich. 48237
Filed Oct. 21, 1965, Ser. No. 499,459
10 Claims. (Cl. 192—4)

ABSTRACT OF THE DISCLOSURE

The invention embodies the use of magnetic clutches for selectively activating drive means between the shafts in a manner to produce one or a plurality of speeds to a driven shaft and for stopping and reversing the driven shaft with or without applying a braking force thereto. The clutches and brakes are electrically operated to simplify the construction and the drive means between the shafts has one element fixed in driving relation to one thereof. This provides simplicity of construction, rapid reversal of rotation of the drive shaft and rapid changes in speed or direction of rotation to reduce the machining time.

This invention relates to electromagnetic transmissions and particularly to a multispeed transmission with or without a reverse drive.

The transmission of the present invention may have one or a plurality of forward speeds and may include a reverse drive providing rapid speed and reverse changes. The device is made up of standard elements which are so related as to be extremely versatile in providing quick changes in speed and in reverse.

The main objects of the invention are: to provide a transmission which will produce a direct drive or a drive through a countershaft to obtain different speeds by the use of electric clutches, to provide a direct drive in a transmission which may be changed to a reverse drive by the use of magnetic clutches and a brake so that the reversing cycle can occur in a very rapid manner; to provide a pair of shafts with drive means from a single motor and with clutch and brake means so arranged that a multiplicity of output speeds may be obtained through the transmission device, and in general to provide a transmission with one or a plurality of change speeds with or without a reverse drive, which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a perspective view of an electromagnetic transmission embodying features of the present invention;

FIG. 2 is a sectional view of structure which provides a two-speed transmission, taken in a plane through the shafts thereof;

FIG. 3 is a view of structure, similarly illustrated in FIG. 2 arranged to provide a forward and reverse speed;

FIG. 4 is a broken sectional view of a drive end of the transmission illustrated in FIG. 1, and FIG. 5 is a diagrammatical view of a four-speed transmission controlled by the dual drive structure illustrated in FIG. 4.

In the present invention, a casing 10 has an adjustable platform 12 on which a motor 13 is secured by bolts 14 and adjusted with the platform about pivots 15 by screws 16. The motor has a single or double sheath pulley 17 on its shaft for driving a belt 18, a pulley 19, and a shaft 21, to which the latter pulley is keyed. The end wall 25 of the casing 10 has apertures 22 therein for receiving a support 23 for a bearing 24 of the self-centering type. The opposite end wall 38 of the casting is similarly provided with apertures 22 and the bearing supports 23 and the bearings 24 which are in a common plane and aligned with the bearings on the opposite end wall 25. The shaft 21 is supported at one end in one of the bearings 24 in the end wall 25 and by a bearing 27 supported in a bearing support 28 extending upwardly from a supporting plate 29 attached to the bottom of the casing 10. The end of the shaft 21 has an armature 31 of a magnetic clutch 30 keyed thereto and supported on a bearing 32 which engages a stator 33 which is also supported by the plate 29 against rotation. The stator has a coil 34 mounted therein and an annular flange 35 which extends over the ends of the enlarged portion of the armature 31. The armature 31 also has an annular flange 36 which is disposed adjacent to the inner surface of the coil 34.

An output shaft 37 is supported in a bearing 24 on the end wall 38 of the casting 10 and on a bearing 39 within the casting on a support 41 which extends upwardly from the supporting plate 29. The inner end of the shaft has a hub 42 keyed thereto containing face plate 43 which is aligned with a face flange 44 on the armature 31. The support 41 has a brake housing 45 containing a coil 46 and a face plate 47 secured thereto. The shaft 37 has a hub 48 keyed thereto containing a face plate 49 which is adjacent to the face plate 47. When the coil 46 is energized, the face plates 47 and 49 are locked together. Similarly, when the coil 34 is energized, the face plate 43 is locked to the face flange 44. The face plate 49 has a floating spline connection 53 to the hub 48, limited in movement by the split ring 54 so that it can move into engagement with the face flange 44. This provides a closed magnetic circuit between the face plate and flange when the coil is energized and the positive rotation of armature and stator without substantial wear when demagnetized. A countershaft 51 is supported by the bearings 24 on the end walls 25 and 38 in the plane of the shafts 21 and 37. A clutch 52, made up of the elements 31 to 44 is secured to the countershaft 51. The face plate 49 of the clutch 52 is mounted on a hub 54 which is supported on the shaft 51 on a bearing 55. The hub is secured to a pulley 56 which is mounted on a pair of bearings 57 secured to the end of the shaft 51. With this arrangement when the clutch 52 is energized, the pulley 56 is driven with the shaft 51. The opposite end of the shaft has a truncated conical hub 58 thereon on which a pulley 59 is secured by screws 61. An over-running clutch 62 is mounted on the shaft 37 having a pulley 63 mounted thereon aligned with the pulley 56 and interconnected therewith by a belt 64.

The shaft 21 has a pulley 65 keyed thereto aligned with the pulley 59 interconnected by a belt 66. The clutch 52 has the stator 33 fixed to the casing 10 by a bracket 67. When the shaft 21 is driven, the pulley 65 drives the belt 66, the pulley 59 and the shaft 51. If the clutch 52 is deenergized, the belt 64 will not be driven thereby. If the coil 34 of the clutch 30 is energized, the plate 43 will engage the flange 44 and the shaft 37 will be driven. When this occurs, the coil 46 of the brake 45 is deenergized. If the speed of the shaft 37 is to be changed, in this arrangement substantially reduced, the coil of the clutch 30 is deenergized and that of the clutch 52 energized so that the shaft 21 will not drive the shaft 37 but the drive will be from the pulley 65 to the pulley 59 to the shaft 51 and from the pulley 56, belt 64 to the shaft 37. The speed of the shaft 37 is substantially reduced from that of the direct drive by the shaft 21. It is to be understood that by changing the pulleys to the opposite shafts that the speed of the shaft 37 would be increased and also by changing the diameters of the pulleys different ratios of speeds may be obtained. In the present instance the use of the over-running clutch 62 permits the shaft 37 to be driven without driving the pulley 63 which would otherwise drive the pulley 56 at an extremely high speed. When changing from one speed to another the brake 45 is employed to immediately reduce the speed of the shaft 37 so that the lower speed can be quickly attained. At the end of an operation the brake permits the shaft 37 to be instantaneously stopped. The shaft 51 has a fan blade 68 secured thereto for the purpose of maintaining the interior of the casing cool.

In FIG. 3, a similar arrangement of clutches and brakes, pulleys and belts is employed for a single speed drive which is reversible. In this arrangement, an input shaft 71 is mounted on bearings 24 in the end walls 25 and 38 of the casting 10. A pulley 72 is keyed to the shaft adjacent to the driving end and a gear 73 is secured to shaft near the opposite end. Between the pulley and gear a fan blade 68 is secured to the shaft for circulating air within the casing. A countershaft 74 is mounted in bearings 24 on the end walls 25 and 38 of the casting parallel to the shaft 71. The countershaft 74 has a pulley 75 mounted thereon by a pair of ball bearings 76 connected to the shaft 71 by a belt 70. The pulley is secured to a hub 77 by pins 78, the hub having a face plate 79 mounted in splined relation thereto for longitudinal movement relative to the hub axis. A clutch 81, which is similar to the clutches 30 and 52 is mounted on the shaft 74 along with the armature 33 and secured against rotation by the bracket 67. An L-shaped bracket 82 has one branch 83 secured to the bottom of the casing 10 by screws 84, the upstanding branch 85 has an aperture 86 therein for supporting a sleeve 87 in which a bearing element 88 rotates when secured to the shaft by a key 89 to provide support for the center of the shaft. The upstanding branch 85 supports a brake 89 which is similar to the brake 45 above described. A clutch 91 similar to the clutch 81, is secured to the shaft 74 with the face plate 79 thereof secured by pins 92 to a sleeve 93, which is supported on a pair of bearings 94. A gear 95 is secured to a flange of the sleeve 93 by screws 96. The teeth of the gear 95 is in mesh with the teeth of the gear 73 so that a driving relation is provided therebetween. When the shaft 71 is driven and the clutch is 81 is engaged and the brake 89 and the clutch 91 is disengaged, the shaft 74 is driven by the drive occurring between the pulleys 72, belt 70 and pulley 75. Since the pulleys 72 and 75 are of the same diameter, the two shafts will be driven at the same speed. It is to be understood that the pulley diameters may be changed so as to obtain an increase or decrease in the drive speed of the shaft 74. When the clutch 81 and brake 89 are deenergized and the clutch 91 energized, the shaft 71 drives the gear 73 which drives the gear 95 through the clutch 91 to drive the shaft 74 in a reverse direction. The speed in reverse will be equal to the forward speed since the gears are of the same diameter. It is to be understood that the gears may be of different diameters so as to produce a different speed in rotation from the driving speed should this be desired. When changing from forward to reverse speed, the brake 89 is energized to immediately stop the rotation and thereafter immediately deenergize so that the reverse rotation can immediately occur. By using the brake, as many as 120 cycles can be obtained in one minute of time.

Referring to FIGS. 4 and 5, a pair of shafts 97 and 98 are mounted in axial aligned relationship with a shaft 99 coplanar therewith. The motor 13 has a double pulley which drives a pair of belts 101 and 102 connected to electric clutches 103 and 104, respectively. The clutches 103 and 104 have stators 100 which are mounted in fixed relation to the casing. An armature 105 is secured to the shaft 99 and 97 being secured by a key 106 in fixed relation thereto. The shaft 99 has a pulley 109 secured on a bearing 111 to the armature 105. The shaft 97 has a pulley 112 secured by a bearing 113 to the armature 105. The belt 101 operates the pulley 112 while belt 102 operates the pulley 109, the pulleys being rotatable on the shafts 99 and 97 when the coils 114 are deenergized. A washer-like face plate 115 is mounted on the face of the pulleys 109 and 112 facing the armature 105, the face plates are supported on pins 116 and slidably mounted on the pulleys 109 and 112 and biased from the armatures 105 by a spring 117. During the free rotation of the pulleys 109, 112, the face plates 115 are held out of engagement with the armatures 105 by the springs. When the coils 114 are energized, the face plates 115 are drawn against the face of the armatures 105 and a drive then occurs through the armature to the respective shafts 97 and 99. The shafts are suitably supported on bearings 118 to the end walls and the bottom of the housing 10 in a manner pointed out hereabove. A pulley 119 on the shaft 97 is connected by a belt 121 to a pulley 122 on the shaft 99. A magnetic clutch 123 on the shaft 99 is connected to a pulley 124 which is connected by a belt 125 to a pulley 126 on the shaft 98. The shafts 97 and 98 have a magnetic clutch 127 on the adjacent ends thereof. The clutches 123 and 127 are similar to the clutch 30 hereinabove described. When the clutch 103 is energized the belt 100 will drive the shaft 97 which will drive the shaft 99 and when the clutch 123 is energized, a drive will occur between the pulley 124, belt 125 and pulley 126 to drive the shaft 98 at a predetermined speed. When the clutch 123 is deenergized and the clutch 127 is energized than a drive will occur between the shafts 97 and 98 at another speed. When the clutch 103 is deenergized and the clutch 104 is energized the shaft 99 is driven, and when the clutch 123 is deenergized and the clutch 127 is energized, the shaft 98 will be driven at a third speed. When the clutch 127 is deenergized the clutch 123 is energized, then the shaft 98 will be driven at a fourth speed. It is to be understood that further clutch arrangement may be provided along with the gears 73 and 95 to provide a reverse rotation to the shaft 98 should this be desired. Similarly, a brake may be employed to stop the operation or to reduce the speed of the driven shaft 98 so that the reduced speed can be reached instantaneously. When the clutches 104 and 127 are energized, then a 2:1 ratio of speed is provided. When the clutches 104 and 127 are energized, than a 1:1 ratio occurs. When clutches 102 and 123 are energized, then a 1:2 ratio is provided, and when clutches 103 and 123 are energized, than a ratio of 1:4 is obtained.

The circuitry for the various clutches can be so interrelated that only those clutches will be energized which will provide the speed desired to thereby prevent any harm or damage to the various elements of the transmission. The case 10 illustrated in FIG. 1 is made up of a box-like housing 131 having a removable cover plate 132 secured thereto by bolts 133. An electrical outlet box 134 is secured to the casing through which the electric conduits to the coils of the brakes and clutches extend.

What is claimed is:

1. In a transmission, a drive shaft, a driven shaft in axial alignment with the drive shaft, a countershaft, a first drive means disposed between said drive shaft and said countershaft, a second drive means disposed between said countershaft and said driven shaft, clutch means for directly joining said drive shaft to said driven shaft, and an overrunning clutch in said second drive means.

2. In a transmission, a drive shaft, a driven shaft in axial alignment with the drive shaft, a countershaft, a first drive means disposed between said drive shaft and said countershaft, a second drive means disposed between said countershaft and said driven shaft, clutch means for directly joining said drive shaft to said driven shaft, an overruning clutch in said second drive means, and brake means on said driven shaft.

3. In a transmission, a drive shaft, a driven shaft in axial alignment with the drive shaft, a countershaft, a first drive means disposed between said drive shaft and said countershaft, a second drive means disposed between said countershaft and said driven shaft, clutch means for selectively joining said drive shaft to said driven shaft and said countershaft to said second drive means, brake means on said driven shaft, and an overrunning clutch in said second drive means.

4. In a transmission, a drive shaft, a driven shaft in axial alignment with the drive shaft, a countershaft, a first drive means disposed between said drive shaft and said countershaft, a second drive means disposed between said countershaft and said driven shaft, clutch means for selectively joining said drive shaft to said driven shaft and said countershaft to said second drive means, brake means on said driven shaft, and an overrunning clutch in said second drive means, said brake and clutch means being electrically actuated.

5. In a transmission, a drive shaft, a driven shaft, a first drive means disposed between said shafts embodying a belt and pulleys, a second drive means disposed between said shafts embodying a pair of gears, and clutch means for selectively securing said drive means to drive said driven shaft through one or the other thereof, said second drive means embodying said pair of gears reversing the direction in which said driven shaft is rotated.

6. In a transmission, a drive shaft, a driven shaft, a first drive means disposed between said shafts embodying a belt and pulleys, a second drive means disposed between said shafts embodying a pair of gears, clutch means for selectively securing said drive means to drive said driven shaft though one or the other thereof, said second drive means embodying said pair of gears reversing the direction in which said driven shaft is rotated, and brake means on said driven shaft.

7. In a transmission, a drive shaft, a driven shaft in axial alignment with said drive shaft, a countershaft, a first drive means disposed between said drive shaft and said countershaft, a second drive means disposed between said countershaft and said driven shaft, clutch means for directly joining said drive shaft to said driven shaft, an overrunning clutch in said second drive means, and clutch means on said countershaft for connecting one of said drive means thereto.

8. In a transmission, a drive shaft, a driven shaft, disposed in axial alignment with the drive shaft, a countershaft, a first drive means disposed between said drive shaft and said countershaft, a second drive means disposed between said countershaft and said driven shaft, clutch means for selectively connecting said drive shaft and said countershaft to a drive motor, clutch means for connecting said second drive means to said countershaft and driven shaft, and clutch means for connecting said drive shaft directly to said driven shaft.

9. In a transmission, a housing, a drive shaft supported on bearings within the housing, a driven shaft supported on bearings within the housing in axial alignment with said drive shaft, a countershaft rotatably mounted within the housing, a motor on said housing having a pair of pulleys thereon, a clutch actuated pulley on said drive shaft, a clutch actuated pulley on said countershaft, belts connecting the motor pulleys to said clutch actuated pulleys, a drive between said drive shaft and said countershaft, a clutch actuated drive between said countershaft and said driven shaft, and clutch means for directly connecting the drive shaft to said driven shaft.

10. In a transmission, a housing, a drive shaft supported on bearings within the housing, a driven shaft supported on bearings within the housing in axial alignment with said drive shaft, a countershaft rotatably mounted within the housing, a motor on said housing having a pair of pulleys thereon, a clutch actuated pulley on said drive shaft, a clutch actuated pulley on said countershafts, belts connecting the motor pulleys to said clutch actuated pulleys, a drive between said drive shaft and said countershaft, a clutch actuated drive between said countershaft and said driven shaft, and clutch means for directly connecting the drive shaft to said driven shaft, said clutch actuated drive between said countershaft and said driven shaft reversing the direction of rotation of said driven shaft.

References Cited

UNITED STATES PATENTS

| | | | |
|---|---|---|---|
| 2,269,215 | 1/1942 | Maier | 192—84 X |
| 2,567,446 | 9/1951 | Polomski | 74—368 |
| 2,599,773 | 6/1952 | Neracher et al. | 74—368 X |
| 2,703,161 | 3/1955 | Keim et al. | 192—4 |
| 2,868,340 | 1/1959 | Wilson et al. | 192—4 |
| 2,951,389 | 9/1960 | Wille | 74—368 X |
| 2,991,661 | 7/1961 | Rambausek | 74—368 X |

DONLEY J. STOCKING, *Primary Examiner.*

ARTHUR T. McKEON, *Examiner.*